US011238596B1

(12) United States Patent
Gadde et al.

(10) Patent No.: US 11,238,596 B1
(45) Date of Patent: Feb. 1, 2022

(54) OBJECT CO-SEGMENTATION IN IMAGE DATA USING SEMANTIC FILTER

(71) Applicant: Amazon Technologies, Inc., Seattle, WA (US)

(72) Inventors: Raghu Deep Gadde, Bellevue, WA (US); Peter Vincent Gehler, Baden-Württemberg (DE)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 327 days.

(21) Appl. No.: 16/369,908

(22) Filed: Mar. 29, 2019

(51) Int. Cl.
*G06T 7/194* (2017.01)
*G06K 9/72* (2006.01)
*G06K 9/62* (2006.01)

(52) U.S. Cl.
CPC ............ *G06T 7/194* (2017.01); *G06K 9/6232* (2013.01); *G06K 9/6256* (2013.01); *G06K 9/6279* (2013.01); *G06K 9/726* (2013.01); *G06T 2207/20024* (2013.01); *G06T 2207/20081* (2013.01); *G06T 2207/20084* (2013.01)

(58) Field of Classification Search
CPC ............ G06T 7/11; G06T 7/162; G06T 7/194
See application file for complete search history.

(56) References Cited

PUBLICATIONS

Quan, Rong, et al. "Object co-segmentation via graph optimized-flexible manifold ranking." Proceedings of the IEEE conference on computer vision and pattern recognition. 2016. (Year: 2016).*

Gadde, Raghudeep, et al. "Superpixel convolutional networks using bilateral inceptions." European conference on computer vision. Springer, Cham, 2016. (Year: 2016).*

Yu, Fisher, and Vladlen Koltun. "Multi-scale context aggregation by dilated convolutions." arXiv preprint arXiv:1511.07122 (2015). (Year: 2015).*

Aurich et al.; Non-linear Gaussian Filters Performing Edge Preserving Diffusion; Deutsche Arbeitsgemeinschaft für Mustererkennung; 1995; pp. 538-545.

Tomasi; Bilateral Filtering for Gray and Color Images; Proceedings of the IEEE International Conference on Computer Vision; 1998; pp. 839-846.

Rother, et al.; Cosegmentation of Image Pairs by Histogram Matching Incorporating a Global Constraint into MRFs; IEEE Conference on Computer Vision and Pattern Recognition (CVPR); 2006; pp. 993-1000; vol. 1.

(Continued)

*Primary Examiner* — Vincent Rudolph
*Assistant Examiner* — Raphael Schwartz
(74) *Attorney, Agent, or Firm* — K&L Gates LLP

(57) ABSTRACT

Devices and techniques are generally described for object co-segmentation in image data using a semantic filter. In various examples, first image data and second image data may be received. First semantic feature data may be determined for the first image data and second semantic feature data may be determined for the second image data. Filtered semantic feature data corresponding to the first semantic feature data may be generated by filtering the first semantic feature data and the second semantic feature data in a semantic feature space. A determination may be made that a first pixel corresponds to a first class of an object, where at least one object of the first class is represented in the first image data and the second image data.

18 Claims, 6 Drawing Sheets

(56) References Cited

PUBLICATIONS

Kopf et al.; Joint Bilateral Upsampling; ACM Transactions on Graphics (SIGGRAPH); 2007; 5 pgs; vol. 26; No. 3.
He et al.; Guided Image Filtering; ECCV 2010, Part I; 2010 14 pgs.
Krähenbühl et al.; Efficient Inference in Fully Connected CRFs with Gaussian Edge Potentials; Advances in neural information processing systems—Supplementary Material; 2011; pp. 109-117.
Achanta et al.; SLIC Superpixels Compared to State-of-the-art Superpixel Methods; IEEE Transactions on Pattern Analysis and Machine Intelligence; 2012; pp. 2274-2282; vol. 34; No. 11).
Rubinstein et al.; Unsupervised Joint Object Discovery and Segmentation in Internet Images; IEEE Conference on Computer Vision and Pattern Recognition (CVPR); 2013; pp. 1939-1946.
Zheng et al.; Conditional Random Fields as Recurrent Neural Networks; Proceedings of the IEEE international conference on computer vision; 2015; pp. 1529-1537.
Xie et al.; Holistically-Nested Edge Detection; 2015 IEEE Intl Conference on Computer Vision; 2015; pp. 1395.
Gadde et al.; Superpixel Convolutional Networks Using Bilateral Inceptions; European Conference on Computer Vision; 2016; pp. 597-613.
Quan et al.; Object Co-segmentation via Graph Optimized-flexible Manifold Ranking; Proceedings of the IEEE Conference on Computer Vision and Pattern Recognition; 2016; pp. 687-695.
Yuan et al.; Deep-dense Conditional Random Fields for Object Co-segmentation; Proceedings of the 26th International Joint Conference on Artificial Intelligence; 2017; pp. 3371-3377; AAAI Press.
Hati et al.; Co-segmentation of Non-homogeneous Image Sets. 25th IEEE International Conference on Image Processing (ICIP); 2018; pp. 266-270.

\* cited by examiner

OBJECT CO-SEGMENTATION IN IMAGE DATA USING SEMANTIC FILTER

BACKGROUND

Segmentation of image data includes separation of pixels determined to be part of the foreground environment from pixels determined to be part of the background environment. For example, a person standing in the foreground of an image may be segmented from the background environment or an article of clothing being held may be segmented from the person holding the article using segmentation techniques. Segmentation techniques may generate segmentation masks that denote whether each pixel of an image is a part of the "foreground" or the "background." Additionally, convolutional neural networks and/or other machine learning models can be used to classify types and/or classes of objects. For example, a convolutional neural network may be used to detect and classify objects present in segmented foreground image data and/or background image data corresponding to a class for which the convolutional neural network has been trained.

DETAILED DESCRIPTION

Figure 1:
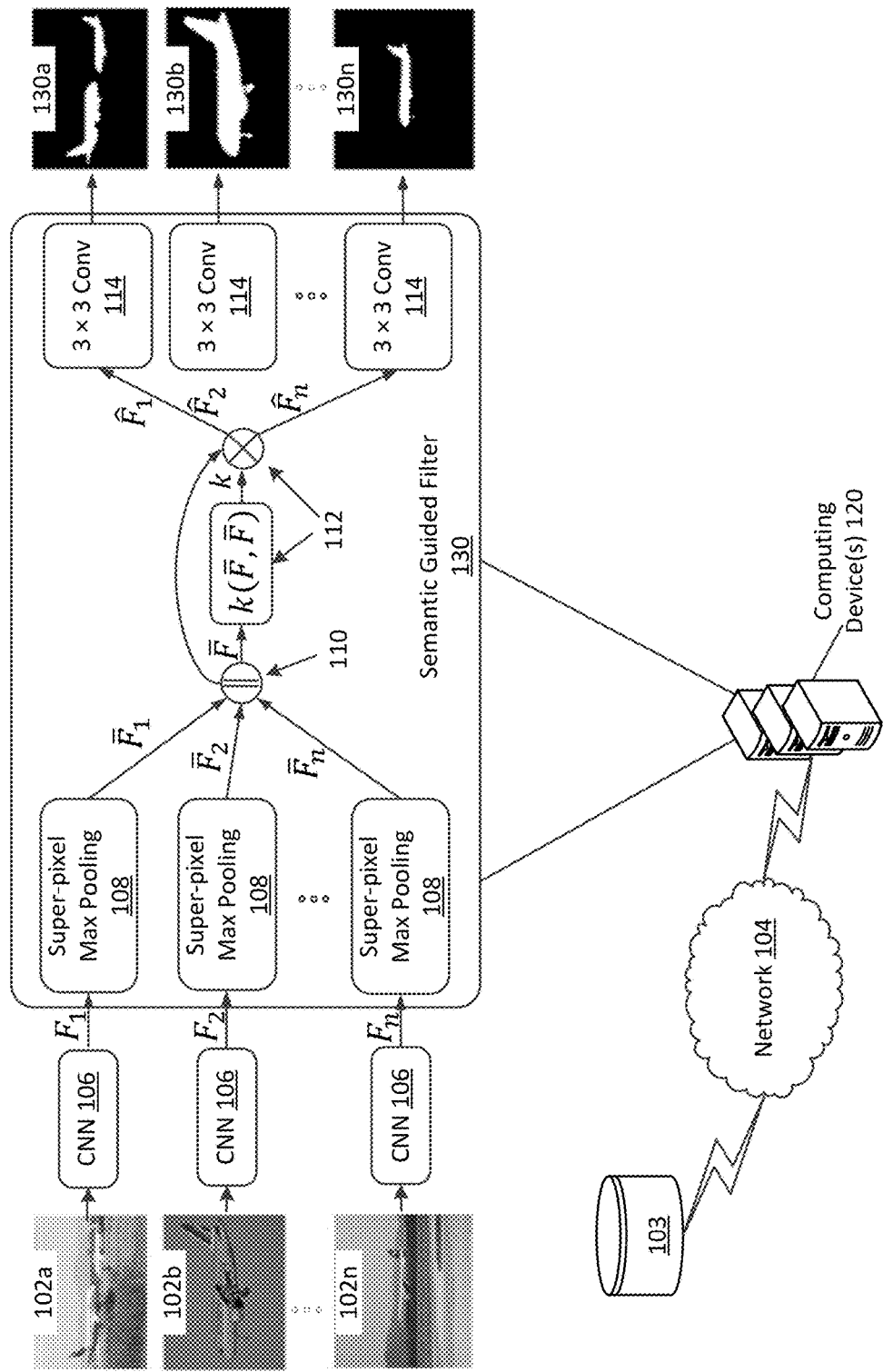
FIG. 1 is a diagram of an example system configured to perform object co-segmentation via semantically guided filtering, according to various embodiments of the present disclosure.

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Co-segmentation of image data refers to techniques that label objects of a common class appearing in multiple images as foreground image data. Co-segmentation does not necessarily classify objects that share a common class. Various co-segmentation techniques are described herein that offer both improved performance and reduced computational complexity relative to previous co-segmentation techniques.

In various techniques described below, a semantic guided filter (SGF) network may be used to propagate representational information, in particular higher-level convolutional neural network (CNN) feature activation, between images. Additionally, in some examples, super-pixels may be computed for input image data so that the SGF architecture may reduce runtime and computational load. In various examples, the SGF network may exchange semantic data in a cross-image fashion so that semantic information may be exchanged among multiple images. Accordingly, super-pixels that are semantically similar may be determined in an intra and inter-image fashion. In various examples, in order to resolve the super-pixel boundaries for every image a foreground/background mask may be predicted using a CNN with dilated convolutions where foreground image data is predicted to be part of the co-segmented object that is common to the images. Additionally, super-pixel features may be converted back to the pixel domain through assignment so that output boundaries in the co-segmentation masks may be defined at the pixel level. Advantageously, the SGF networks described herein may be trained using back-propagation within any desired framework. Additionally, the SGF networks described herein may be computationally efficient and may process a variable number of input images at inference time.

Generally, in machine learned models, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result may determine the activation of a neuron in a subsequent layer. In addition, a bias value may be used to shift the output of the activation function to the left or right on the x-axis and thus may bias a neuron toward inactivation.

Generally, in machine learning models, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent algorithm to incrementally adjust the weights to cause the most rapid decrease (or increase) to the output of the loss function. The method of updating the parameters of the machine learning model may be referred to as back propagation.

FIG. 1 is a diagram of an example system 100 configured to perform object co-segmentation via semantically guided filtering, according to various embodiments of the present disclosure. As depicted in FIG. 1, computing device(s) 120 may include a non-transitory computer-readable memory 103 and/or may be configured in communication with non-transitory computer-readable memory 103, such as over network 104. In various examples, network 104 may represent a local area network (LAN) and/or a wide area network (WAN) such as the internet.

In various examples, one or more images of a set of input image data including input images 102a, 102b, . . . 102n (e.g., individual frames of image data, frames of video data, etc.) may include a common object. Generally, a frame of image data and/or a picture of image data may comprise a two-dimensional grid of pixels, wherein each pixel is associated with a pixel value. In the example depicted in FIG. 1, each of input images 102a, 102b, . . . , 102n depict an airplane, when rendered on a display. That is, the pixel values of input images 102a, 102b, 102n may represent, in part, an airplane. The objects may not necessarily be the same object from image to image. For example, different airplanes may be depicted among input images 102a, 102b, ..., 102n. Additionally, in various examples, not all images of the set of input images 102a, 102b, ..., 102n may include the common object. For example, at least one image of the set of input images 102a, 102b, ..., 102n may not include pixels representing an airplane. Input images 102a, 102b, ..., 102n may be referred to herein as input images $I_i$.

Input images 102a, 102b, ..., 102n may be sent as input to a convolutional neural network (CNN) 106. CNN 106 may be trained to detect and/or classify objects of various classes. For example, CNN 106 may be trained to detect pixels in images representing airplanes and may be further effective to classify the pixels representing airplanes as belonging to a class "airplane" from among other classes of objects. In various examples, CNN 106 may be trained to detect and/or classify a variety of different objects. For example, CNN 106 may be trained using ImageNet or another annotated set of image training data. Generally, hidden layers of CNN 106 may generate feature data (e.g., feature vectors and/or feature maps) representing semantic interpretations of objects within a particular input image. In the example of airplanes, hidden layers of CNN 106 may generate feature data representing a wing, a cockpit, the tail, or some other aspect of an airplane. Such feature data may be referred to herein as semantic feature data. Generally, the later the layer of a CNN model, the richer the semantic information provided by semantic feature data extracted from that layer. As used herein, a "later" layer refers to a layer that is closer to the output layer of the CNN relative to one or more "earlier" layers that are closer to the input of the CNN. Generally, the last layer, or "output layer" of the CNN 106 provides a probability that a detected object belongs to a particular class. For example, the output layer of CNN 106 may describe that an object detected in input image 102a represents an airplane with confidence score of 98.1%. Although FIG. 1 depicts CNN 106, in various examples, another machine learned network and/or algorithm may be used to extract semantic feature data from input images 102a, 102b, ..., 102n.

In various examples described herein, semantic feature data $F_1, F_2, ..., F_n$ may be extracted from the CNN 106 and may be provided to semantic guided filter 130. For example, semantic feature data $F_1$ may be extracted from input image 102a, semantic feature data $F_2$ may be extracted from input image 102b, and so on. Each semantic feature may be a semantic representation of a respective input image. For example, semantic feature data $F_1, F_2, ..., F_n$ may be a semantic representation of each pixel in input image 102a. In various examples, CNN 106 may produce representations of input images 102a, 102b, ..., 102n at a down-sampled resolution. Accordingly, each semantic feature $F_1, F_2, ..., F_n$ may be a tensor representing down-sampled pixels in terms of a desired number of channels C, the width W (in pixels), and the height H (in pixels). In at least some examples, it may be advantageous to extract the semantic feature data from the second to last layer of CNN 106. This is because, in various examples, the penultimate layer of CNN 106 may represent the richest amount of semantic information, relative to other layers of CNN 106. However, in various embodiments, semantic feature data may be extracted from other layers of CNN 106 apart from the penultimate layer, in accordance with the various techniques described herein.

Generally, for every image $I_1, ..., I_n$ CNN 106 may be used to extract high level features $F_i \in \mathbb{R}^{C \times W \times H}$. Features $F_i$ may be represented as a tensor $F=(F_1, ..., F_n) \in \mathbb{R}^{N \times C \times W \times H}$, where C denotes the number of channels, W denotes the width (in pixels), and H denotes the height (in pixels) at the level where the CNN features are extracted.

At action 108 of FIG. 1, a super-pixelization into S super-pixels may be determined based on the respective semantic feature data $F_1, F_2, ..., F_n$ for every input image $I_i$ (e.g., for input images 102a, 102b, ... 102n). For example, the SLIC technique described in *Slic superpixels compared to state-of-the-art superpixel methods* (IEEE Transactions on Pattern Analysis and Machine Intelligence, 34(11):2274-2282, 2012 by R. Achanta et al.) may be used to generate S super-pixels for each input image $I_i$. The value S may be the same for all images that are co-segmented together (e.g., for each input image $I_i$). Generally, super-pixels define an often irregularly-shaped region of contiguous pixels in an image that are similar in one or more ways. For example, the constituent pixels of a super-pixel may be similar in terms of color, intensity, edge definition, etc. Super-pixels are often non-rectangular in shape, but may be of any shape. Super-pixels may reduce the computational load of the various object co-segmentation techniques described herein by an order of magnitude or more, and may improve filtering speed and reduce the memory footprint of the co-segmentation task. The number of super-pixels S used during the co-segmentation techniques described herein may be a hyperparameter selected based on a desired implementation.

At action 108, after determining the S super-pixels for each input image, a feature representation (e.g., a vector representation representing semantic information for the super-pixel) is determined for each super-pixel of each image. The feature representation for each super-pixel may be determined in various ways. For example, max-pooling or average-pooling may be used to determine the feature representation for each pixel. Max-pooling may comprise determining the maximum value (e.g., the highest magnitude) among all the semantic feature representations of pixels within a super-pixel. Similarly, average-pooling may comprise determining an average value of all feature representations of pixels within a super-pixel.

Generally, the semantic feature data from activations from all pixels within a super-pixel may be max-pooled or average-pooled into a single feature representation per super-pixel. $S_k$ may be the set of all pixel indices that belong to super-pixel k. For example, the following max-pooling equation may be used to determine the feature representation for each input image: $\overline{F}_i^k(c) = \max_{p \in S_k} F_i(p, c)$, where F(p, c) is the activation of channel c and pixel p. Accordingly, $\overline{F}_1$ may represent max-pooled semantic feature information for each super-pixel in input image 102a, $\overline{F}_2$ may represent max-pooled semantic feature information for each super-pixel in input image 102b, etc. The concatenated tensor for all super-pixels may be $\overline{F}=(\overline{F}_1, ..., \overline{F}_n) \in \mathbb{R}^{N \times C \times S}$. In various examples, the feature representation for each input image $\overline{F}_i^k(c)$ may be concatenated at action 110.

Deep CNN features (e.g., feature data extracted from a hidden layer, such as the penultimate layer of CNN 106) may be rich in semantic information and may be used as guidance to propagate information between semantically consistent regions of multiple images. A Gaussian filter may be used to propagate information within $\overline{F}$. The extracted deep CNN features $F_i$ may be used at action 112 twice—as guidance and as the signal to be filtered. $\overline{F}(i, s) \in \mathbb{R}^C$ may be denoted as the C dimensional semantic feature vector for super-pixel s in image i. The semantic guided filter 130 computes $$\hat{F}(i,s) = \Sigma_j \Sigma_t k(\overline{F}(i,s), \overline{F}(j,t)) \overline{F}(j,t) \quad (1)$$

with a Gaussian kernel $$k(f, g; \sigma) = \exp\left(-\frac{1}{2\sigma}\|f - g\|^2\right),$$

where $\sigma \in \mathbb{R}_+$. Note, that to compute the filter kernel, semantic super-pixel features $\overline{F}$ may be used instead of features representing appearance (e.g., color, intensity, and/or spatial features). Conceptually, the function k determines the distance (in the semantic space) between a feature representation $\overline{F}(i, s)$ and a feature representation $\overline{F}(j, t)$ and uses this weight k to weight the feature representation $\overline{F}(j, t)$. The term $\hat{F}(i, s)$ from equation (1) is determined for every input image (e.g., input images 102a, 102b, . . . 102n) and represents semantic similarity between super-pixels in image i and super-pixels of all input images (including image i). The greater the similarity, semantically, between a semantic super-pixel feature $\overline{F}(i, s)$ and a semantic super-pixel feature $\overline{F}(j, t)$, the higher the weight that is given to the semantic super-pixel feature $\overline{F}(j, t)$ by the function k. Conversely, if semantic super-pixel t is not similar to any other super-pixel, the output of the k function will be lower (e.g., k=1), and a lower weight given to super-pixel t. Conceptually, super-pixels that are semantically similar to other super-pixels either in the same image or in a different image are weighted higher by equation (1) as these super-pixels are determined to semantically represent some portion of the same object class (e.g., both super-pixels may semantically represent an airplane cockpit, a human eye, a dog's nose, etc.). The semantically-filtered super-pixel representations $\hat{F}1, \hat{F}2, \ldots, \hat{F}n$ may be matrices representing semantically-filtered feature information for each super-pixel of each respective input image (e.g., as down-sampled by CNN 106). Accordingly, $\hat{F}1$ may be a matrix representing semantically-filtered feature information for each super-pixel of input image 102a, $\hat{F}2$ may be a matrix representing semantically-filtered feature information for each super-pixel of input image 102b, etc.

For co-segmentation, determination of semantic similarity between and within images may be advantageous over spatial appearance similarity. For example, spatial similarity between images may be relatively weak and spatial registration between images may be missing altogether.

The semantically-filtered super-pixel representations $\hat{F}$ (e.g., $\hat{F}1, \hat{F}2, \ldots, \hat{F}n$) output from action 112 may be transformed using a convolution operation (e.g., a 1×1 convolution) into 32 dimensional representation vectors (or other desired number of dimensions). In various examples, the convolution operation may be used to transform the semantically-filtered super-pixel representations $\hat{F}$ into a vector representation with a number of dimensions that is equal to a number of neurons in an input layer of CNN 114. These semantically-filtered super-pixel representations may be converted back to pixel features by assignment on a pixel-by-pixel basis. The pixel features may be input to CNN 114 (e.g., a dilational CNN, such as a 3×3 CNN with dilations 2, 4, and 8, or a non-dilational CNN). CNN 114 may include a different number of layers and/or different dilations depending on the desired implementation. CNN 114 may be trained to use the pixel features to predict the binary classification (e.g., foreground or background) of every pixel, where foreground pixels represent pixels determined to be part of a common object present in input images 102a, 102b, . . . , 102n, and background pixels represent pixels that are determined not to be part of a common object among the input images. Super-pixel boundaries are dissolved (e.g., removed) during the convolution operation forming the 32 dimensional (or other desired number of dimensions) vector. Parameters of CNN 114 may be learned using back propagation to determine whether pixels are "foreground" (and are thus part of a common object among the input images) or "background" (and are thus not part of a common object among the input images).

A modified cross entropy loss function (equation (2)) may be used to account for class imbalance between foreground and background. The loss decomposes over training images $$L = \sum_{i=1}^{n} L_i,$$

where $L_i = -\alpha_i \Sigma_{j \in Y_i^+} \log P(y_j=1|I_i)$ $-(1-\alpha_i)\Sigma_{j \in Y_i^-} \log P(y_j=0|I_i),$  (2)

with $\alpha_i = |Y_i^-|/(|Y_i^+|+|Y_i^-|)$. $Y_i^{30}$, $(Y_i^-)$ are the indices of pixels belonging to foreground (background) in image $I_i$. The loss function may be used for the feed-forward network architecture of system 100 including CNN 106 and/or CNN 114.

Advantageously, the techniques described above may be effective to co-segment objects of a variable number of images even if one or more images of the set of input images do not include an object that is common to the remainder of the input images.

Figure 2:
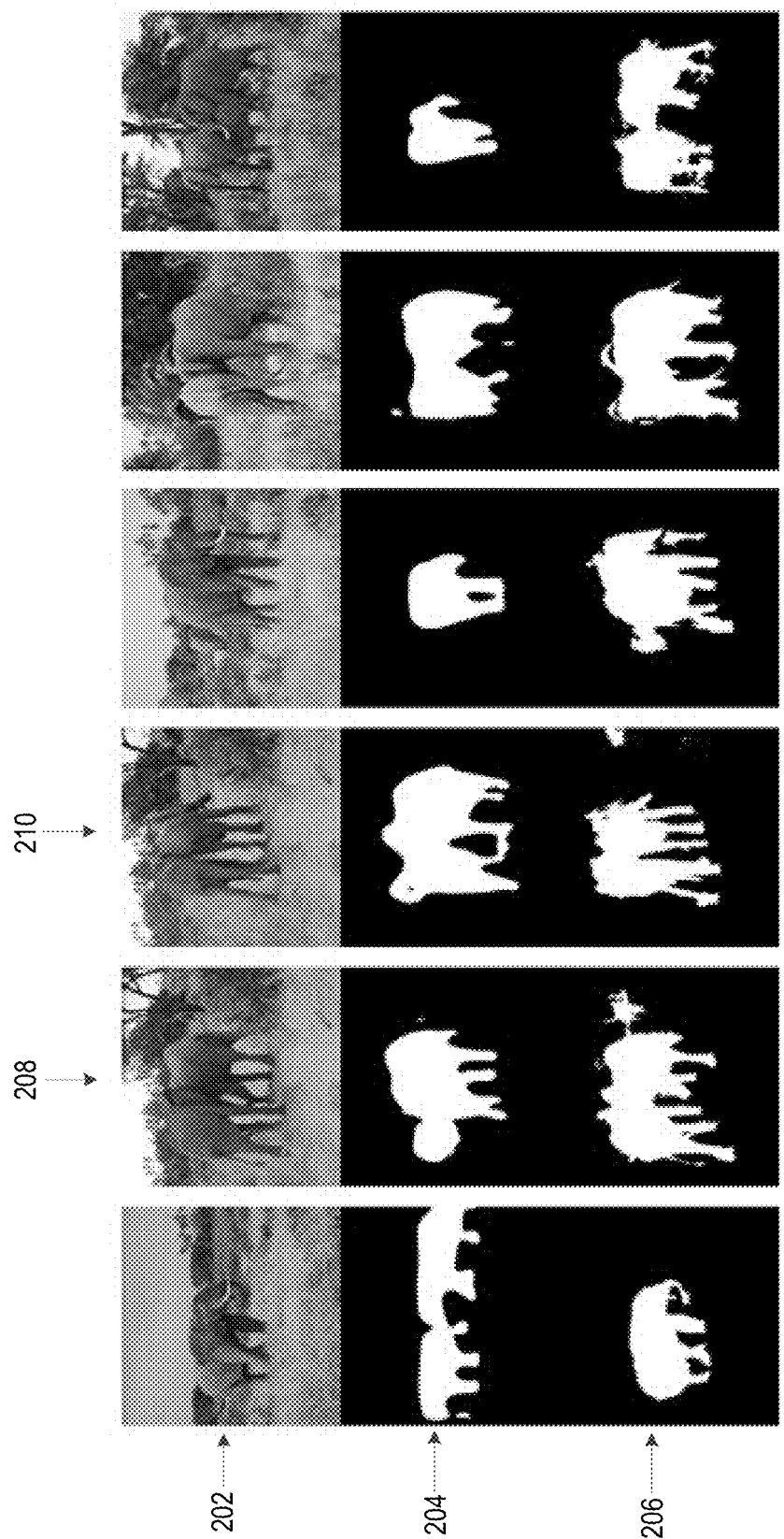
FIG. 2 depicts an original set of images and two sets of object co-segmentation images generated according to different techniques, in accordance with various embodiments of the present disclosure.

FIG. 2 depicts an original set of images 202 and two sets of object co-segmentation images generated according to different techniques. In the example depicted in FIG. 2, the top row of images 202 are images from the iCoseg dataset (images 202 courtesy of Batra, D., Kowdle, A., Parikh, D., Luo, J., and Chen, T., "Interactively Co-segmentating Topically Related Images with Intelligent Scribble Guidance," International Journal of Computer Vision, Volume 93, Issue 3, pp 273-292 (2011), and Batra, D., Kowdle, A., Parikh, D., Luo, J., and Chen, T. "iCoseg: Interactive Co-segmentation with Intelligent Scribble Guidance", Computer Vision and Pattern Recognition (2010)). As shown, each of images 202 depicts one or more elephants. Co-segmentation images 204 (middle row, FIG. 2) depict co-segmentation masks generated using prior co-segmentation techniques. Co-segmentation images 206 (bottom row, FIG. 2) depict co-segmentation masks generated using various co-segmentation techniques described in the present disclosure. As depicted in FIG. 2, the co-segmentation images 204 have failed to co-segment some of the elephants that are further away from the camera (e.g., the far away elephants in column 208 and column 210). Conversely, co-segmentation images 206 capture the far away elephants in column 208 and column 210.

Figure 3:
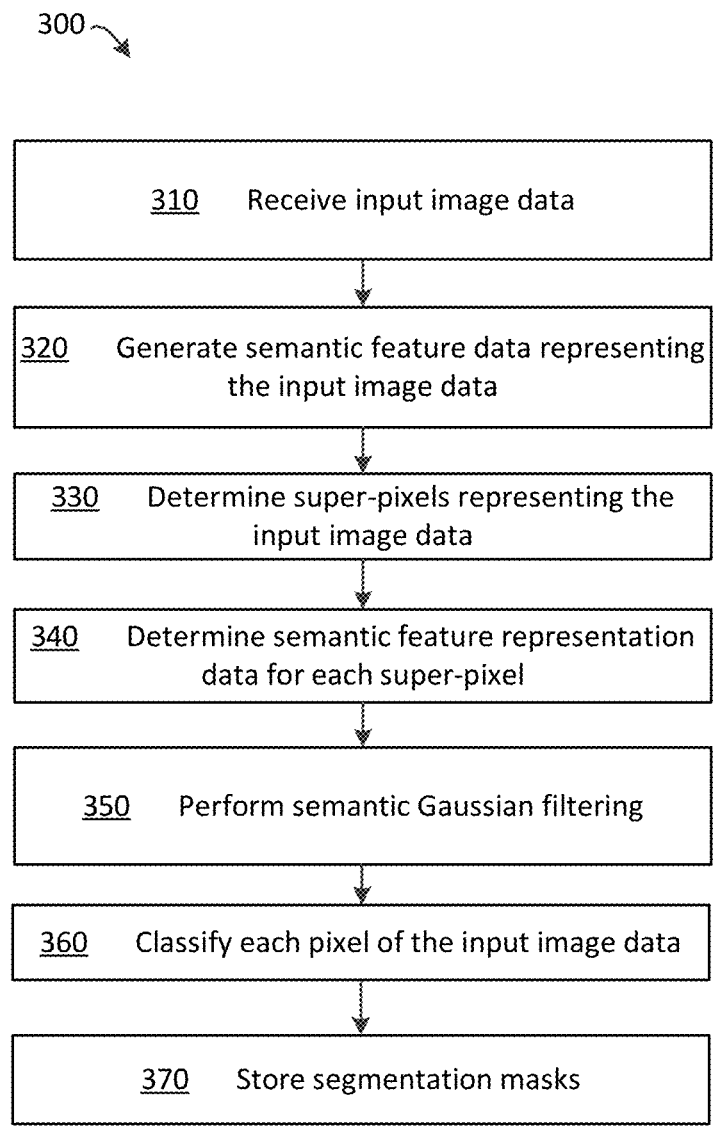
FIG. 3 depicts a flow chart showing an example process for object co-segmentation via semantically guided filtering, in accordance with various aspects of the present disclosure.

FIG. 3 depicts a flow chart showing an example process 300 for providing object co-segmentation in image data using a semantic filter, in accordance with various aspects of the present disclosure. Those portions of FIG. 3 that have been previously discussed in reference to FIGS. 1-2 may not be described again for purposes of clarity and brevity. The actions of the process 300 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 300 may begin at action 310, "Receive input image data." At action 310 a plurality of images may be received. For example, multiple frames of image data (e.g., multiple image files) may be received by one or more computing devices (e.g., computing device(s) 120). In some other examples, the input image data may be one or more constituent frames from a video. In various further examples, the input image data may be video data.

Processing may continue from action 310 to action 320, "Generate semantic feature data representing the input image data." At action 320, the input image data received at action 310 may be input into a trained machine learning network, such as a CNN trained to detect and/or classify one or more objects present in image data. Semantic feature data may be extracted from one or more hidden layers of the machine learning network. The semantic feature data may comprise semantic information representing one or more aspects of the input image data. For example, in a CNN trained to detect and/or classify humans, feature data extracted from the penultimate layer of the CNN may represent various body parts of a human. For example, semantic feature data may represent a hand, a face, an eye, a nose, etc. Note that the particular layer of the machine learning network from which the semantic feature data is extracted may be selected according to a desired implementation. In many cases, it may be advantageous to extract semantic feature data from the penultimate layer of the machine learning model, as the penultimate layer may represent the most semantically rich feature data (e.g., the feature data that represents higher level features, such as the body parts discussed above, of the image data).

Processing may continue from action 320 to action 330, "Determine super-pixels representing the input image data." At action 320, each input image may be divided into S super-pixels. Determination of super-pixel boundaries may be performed in accordance with various known techniques. For example, the SLIC technique may be used to determine super-pixel boundaries. As described herein, super-pixels define an often irregularly-shaped region of contiguous pixels in an image that are similar in one or more ways. For example, the constituent pixels of a super-pixel may be grouped based on a similarity in terms of color, intensity, edge definition, etc. Super-pixels are often non-rectangular in shape, but may be of any shape. Super-pixels may reduce the computational load of the various object co-segmentation techniques described herein by an order of magnitude or more, and may improve filtering speed and reduce the memory footprint of the co-segmentation task.

Processing may continue from action 330 to action 340, "Determine semantic feature representation data for each super-pixel." At action 340, a representative feature vector (e.g., semantic feature representation data) may be determined for each super-pixel determined at action 330. For example, max-pooling, average pooling, and/or other pooling techniques may be used to determine the semantic feature representation data. In various examples, $\bar{F}_i^k(c) = \max_{p \in S_k} F_i(p, c)$ may be computed, where $F(p, c)$ is the activation of channel c and pixel p. Additionally, in at least some examples, after pooling, the semantic feature representation data may be concatenated into a tensor $\bar{F}$ representing all super-pixels (e.g., $\bar{F} = (\bar{F}_1, \ldots, \bar{F}_n) \in \mathbb{R}^{N \times C \times S}$).

Processing may continue from action 340 to action 350, "Perform semantic Gaussian filtering." At action 350, a Gaussian kernel may be used to compute $\hat{F}(i, s)$ representing a semantically-filtered super-pixel representation for each input image. The semantic Gaussian filtering operation weights each super-pixel according to its similarity (in the semantic space) with respect to every other super-pixel (in both the image including the super-pixel and in each other image).

Processing may continue from action 350 to action 360, "Classify each pixel of the input image data." At action 360, each pixel of the input image data (e.g., each pixel of each input image) may be classified as "foreground" or "background." As used herein, foreground pixels denote those pixels that are determined to semantically relate to an object that is common among multiple images of the input image data. Similarly, as used herein, background pixels denote those pixels that are determined to be semantically unrelated to the object that is common among multiple images of the input image data. Pixels may be represented as foreground and/or background using a single bit (e.g., foreground pixels may be represented using a segmentation value of "1" while background pixels may be represented using a segmentation value of 0). Segmentation masks may be generated from the classified pixels. Segmentation masks may be representations of the original input image data, wherein each pixel is denoted as either foreground or background, as described above. Visually, foreground pixels may be rendered as white while background pixels may be rendered as black, although other colors may be used. Co-segmentation images 204 and 206 represent segmentation masks.

In various examples, a machine learning network may be used to classify each pixel of the input image data based on the semantically-filtered feature representation data $\hat{F}(i, s)$ generated for each input image. For example, a CNN may be used, such as the CNN 114 in FIG. 1, to predict whether each pixel belongs to foreground, and thus represents the common object, or background and thus does not represent the common object.

Processing may continue from action 360 to action 370, "Store segmentation masks." After classification of each pixel of the input images as foreground or background, the segmentation masks generated (e.g., the frames of image data where each pixel is represented using segmentation values of 1 or 0) may be stored in a non-transitory computer-readable memory (e.g., memory 103 depicted in FIG. 1).

Figure 4:
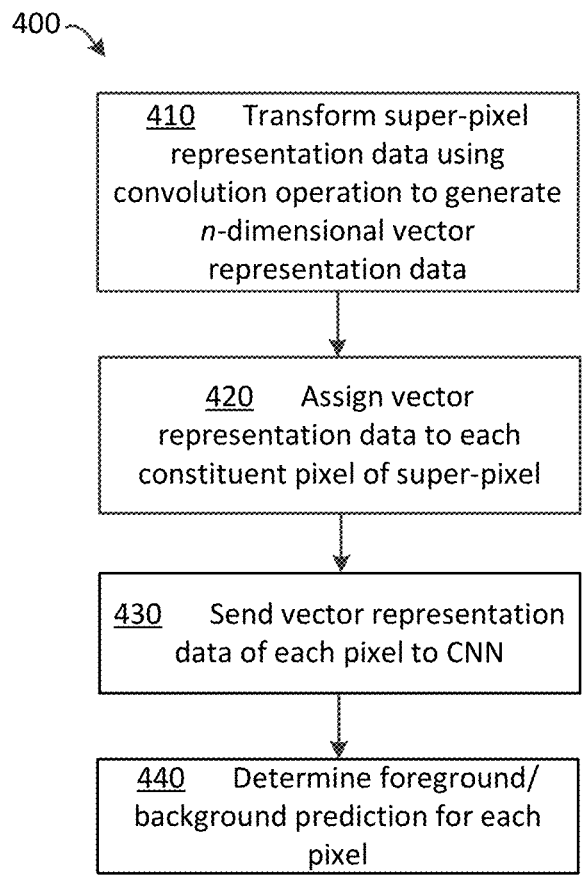
FIG. 4 depicts a flow chart showing an example process for pixel-by-pixel classification, in accordance with various aspects of the present disclosure.

FIG. 4 depicts a flow chart showing an example process 400 for classifying each pixel of input image data, in accordance with various aspects of the present disclosure. Those portions of FIG. 4 that have been previously discussed in reference to FIGS. 1-3 may not be described again for purposes of clarity and brevity. The actions of the process 400 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

In various examples, the actions of process 400 may represent actions that may occur after performing semantic Gaussian filtering of the semantic feature representations of the super-pixels (e.g., after action 350 of FIG. 3) in order to classify each pixel in accordance with action 360 of FIG. 3.

Process 400 of FIG. 4 may begin at action 410, "Transform super-pixel representation data using convolution operation to generate n-dimensional vector representation data." At action 410, the semantically-filtered super-pixel representations $\hat{F}$ (e.g., $\hat{F}1, \hat{F}2, \ldots, \hat{F}n$) may be transformed using a convolution operation (e.g., a 1×1 convolution) into an n-dimensional representation vector. In various examples, action 410 may be performed in order to condition the semantically-filtered super-pixel representations $\hat{F}$ for input into a CNN, and/or other machine learning network, trained to classify pixels as either representing some portion of an object that is commonly represented in two or more input images or not.

Processing may continue from action 410 to action 420, "Assign vector representation data to each constituent pixel of super-pixel." At action 420, for a given super-pixel, the n-dimensional vector representation data generated for that super-pixel at action 410 may be assigned to each constituent pixel of the super-pixel.

Processing may continue from action 420 to action 430, "Send vector representation data of each pixel to CNN." At action 430, the per-pixel vector representation data generated at action 420 may be input into a CNN (e.g., CNN 114 of FIG. 1). In at least some examples, the CNN may be a 3×3 dilational CNN with dilations of 2, 4, and 8, although any other CNN may be used, in accordance with the desired implementation.

Processing may continue from action 430 to action 440, "Determine foreground/background prediction for each pixel." At action 440, the activations in the output layer of the CNN (e.g., CNN 114) may predict whether each pixel belongs to some portion of a common object (e.g., an object represented in two or more of the input images) or not. As previously described, if a pixel is determined to belong to a common object, the pixel may be labeled as foreground image data (e.g., with a segmentation value of "1"). Similarly, if a pixel is determined to not belong to a common object, the pixel may be labeled as background image data (e.g., with a segmentation value of "0").

In various examples, the semantic guided filter 130 may be applied iteratively in order to refine the co-segmentation masks of commonly-appearing objects in image data. Additionally, in some examples, the various co-segmentation techniques described herein may be used to recognize common objects appearing in image and/or video data without necessarily determining a classification of those objects. For example, a number of images may display an object from various angles and with the object in various positions and/or orientations. The various co-segmentation techniques described herein may be effective to generate co-segmentation masks that label the common object (e.g., objects of a common class) as foreground in each segmentation mask. In some examples, a particular image may be labeled with the boundary and/or boundaries of an object (e.g., an object of interest). The labeling may be extracted as feature information and may be used to determine which other images of a set of images (and/or frames of a video) contain the same object or objects of the same class. Generation of training data for object recognition/classification may typically require manual annotation and manual selection of borders of an object-of-interest. Using various co-segmentation techniques described herein, common objects may be identified in image data without requiring manual selection of pixels pertaining to the objects.

Figure 5:
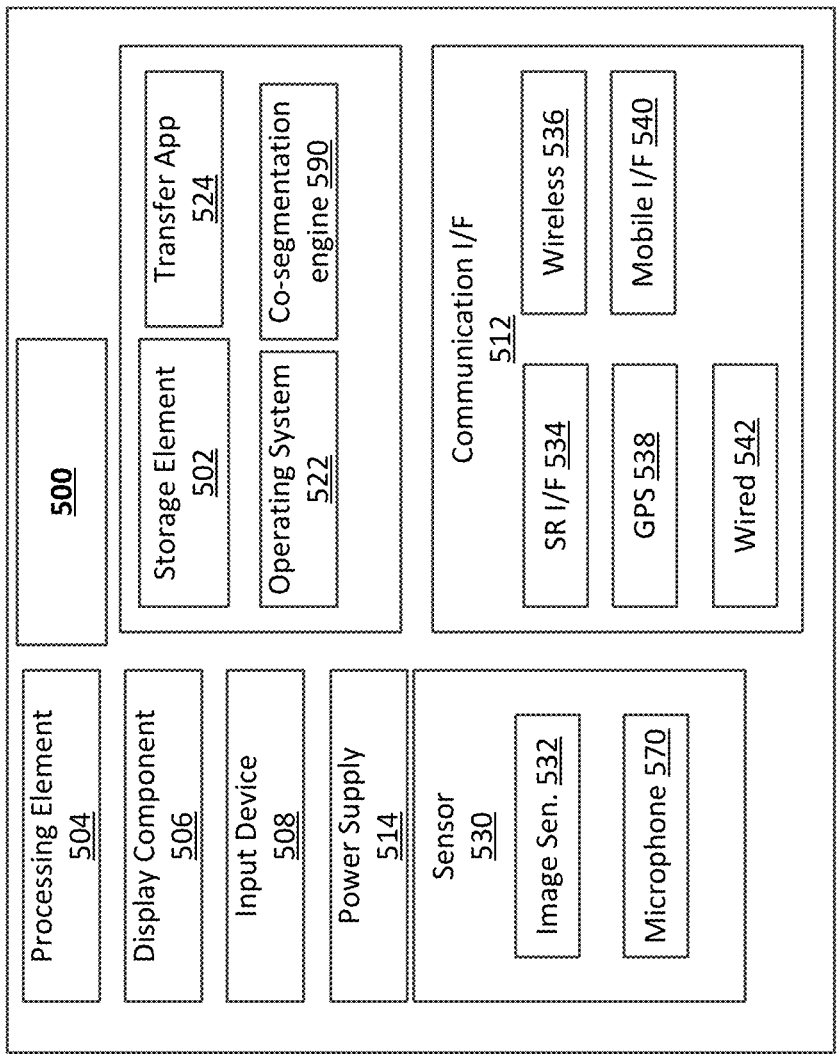
FIG. 5 is a block diagrams showing an example architecture of a computing device that may be used in accordance with various embodiments described herein.

FIG. 5 is a block diagram showing an example architecture 500 of a computing device that may be used to perform object co-segmentation via semantically guided filtering, in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable storage media devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store segmentation masks generated using the object co-segmentation techniques described herein.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor 532 and/or microphone 570 included in the architecture 500.

A co-segmentation engine 590 may be effective to perform one or more the co-segmentation techniques described herein, such as one or more techniques described above in reference to FIG. 1. For example, co-segmentation engine 590 may implement one or more CNNs that may be used to extract semantic feature data from input image data. Additionally, co-segmentation engine 590 may be effective to divide input image data into super-pixels based on similarities between contiguous groups of pixels in the input image data. Further, co-segmentation engine 590 may be effective to perform max-pooling, average pooling and/or some other pooling to determine representative semantic feature data for each super-pixel in each input image. In some further examples, co-segmentation engine may 590 be effective to semantically filter input image data using a Gaussian filter, as described above in reference to FIG. 1. The semantically-guided filter data may propagate semantic information between different input images so that objects of a common class represented in the various input images may be determined.

In various examples, co-segmentation engine 590 may be effective to determine filtered semantic feature data for each super-pixel in each image using the Gaussian filtering operation. A dilational CNN may be used to classify each pixel of each super-pixel based on the filtered semantic feature data. Accordingly, segmentation maps may be generated for each input image in which objects of a common class appearing in the input images may be labeled with foreground image data while objects that are not of a common class may be labeled as background image data.

When implemented in some user devices, the architecture 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display input images and/or segmentation masks generated in accordance with the various techniques described herein.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice requests. In various examples, audio captured by microphone 570 may be streamed to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. An image sensor 532 is shown in FIG. 5. Some examples of the architecture 500 may include multiple image sensors 532. For example, a panoramic camera system may comprise multiple image sensors 532 resulting in multiple images and/or video frames that may be stitched and may be blended to form a seamless panoramic output. An example of an image sensor 532 may be a camera configured to capture color information, image geometry information, and/or ambient light information.

As noted above, multiple devices may be employed in a single system. In such a multi-device system, each of the devices may include different components for performing different aspects of the system's processing. The multiple devices may include overlapping components. The components of the computing device(s) 120, as described herein, are exemplary, and may be located as a stand-alone device or may be included, in whole or in part, as a component of a larger device or system.

Figure 6:
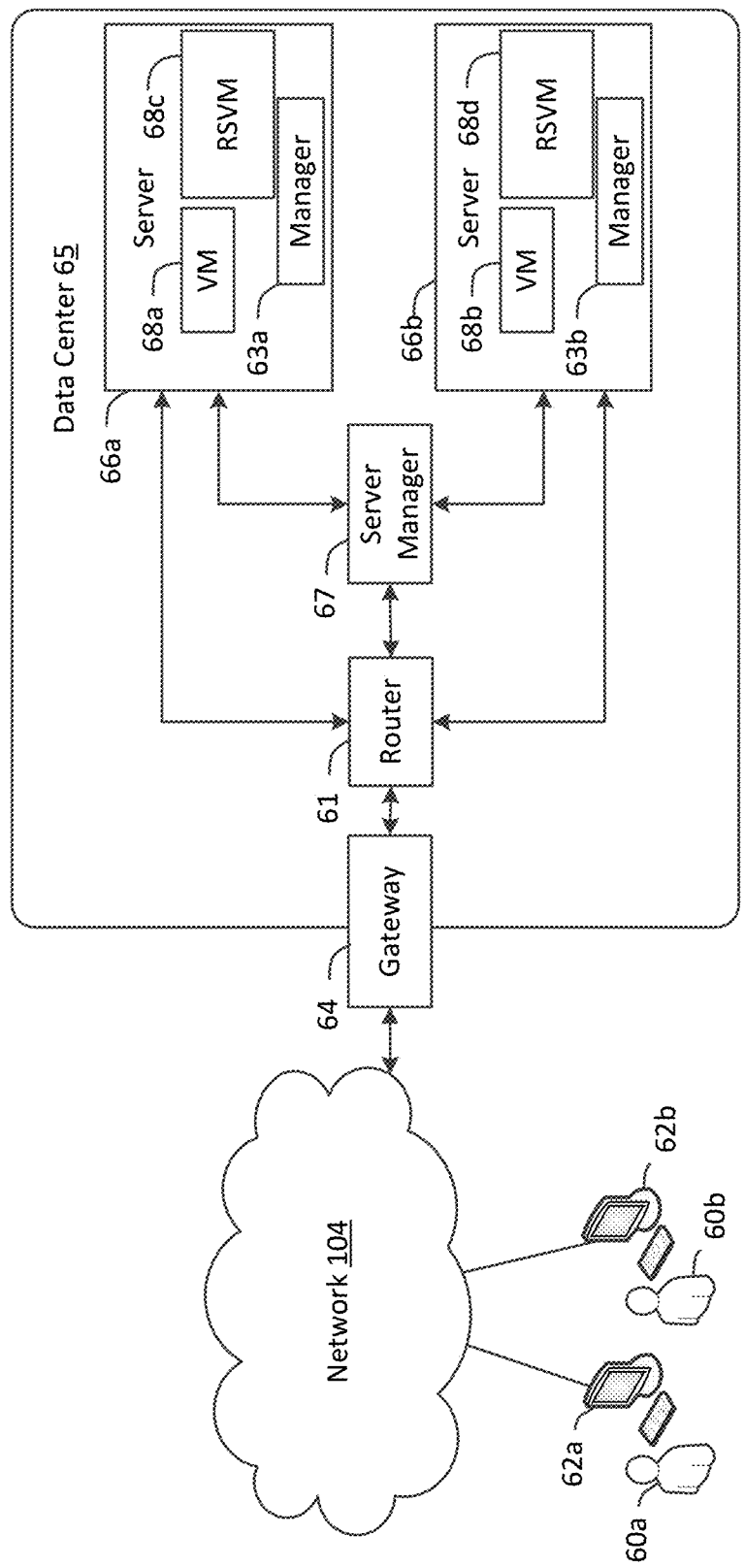
FIG. 6 is a diagram illustrating an example system for sending and providing data that may be used in accordance with the present disclosure.

An example system for sending and providing data and generation of synthetic data for computer vision object detection models will now be described in detail. In particular, FIG. 6 illustrates an example computing environment in which the embodiments described herein may be implemented. For example, the computing environment of FIG. 6 may be used to provide co-segmentation as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60a and 60b (which may be referred herein singularly as user 60 or in the plural as users 60) via user computers 62a and 62b (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. In various examples, the instances may be configured to execute one or more of the various co-segmentation techniques described herein.

These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 104. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, used to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method of co-segmenting objects in image data, the method comprising:
   receiving a first frame of image data and a second frame of image data, wherein the first frame, when rendered on a display, includes a first object of a first class, and wherein the second frame, when rendered on the display, includes a second object of the first class;
   sending the first frame and the second frame to a first convolutional neural network (CNN);
   determining, from a hidden layer of the first CNN, first semantic feature data representing the first frame of image data;
   determining, from the hidden layer of the first CNN, second semantic feature data representing the second frame of image data;
   determining, for the first frame of image data, a first super-pixel comprising a first plurality of contiguous pixels of the first frame of image data, wherein the first super-pixel represents a portion of the first object;
   determining, for the second frame of image data, a second super-pixel comprising a second plurality of contiguous pixels of the second frame of image data, wherein the second super-pixel represents a portion of the second object, wherein the portion of the first object corresponds to the portion of the second object;
   determining, using a Gaussian filter, a similarity in a semantic feature space between the first semantic feature data for the first super-pixel and the second semantic feature data for the second super-pixel;
   determining that the first super-pixel and the second super-pixel correspond to a common object of the first frame of image data and the second frame of image data;
   generating a first segmentation mask for the first frame, wherein the first plurality of contiguous pixels are labeled as foreground image data in the first segmentation mask; and
   generating a second segmentation mask for the second frame, wherein the second plurality of contiguous pixels are labeled as the foreground image data in the second segmentation mask.

2. The method of claim 1, further comprising:
   determining that the first semantic feature data comprises a highest magnitude among pixels of the first plurality of contiguous pixels;
   selecting the first semantic feature data to represent the first super-pixel;
   determining that the second semantic feature data comprises the highest magnitude among pixels of the second plurality of contiguous pixels; and
   selecting the second semantic feature data to represent the second super-pixel.

3. The method of claim 1, further comprising:
   determining, using the Gaussian filter, first weighted semantic feature data corresponding to the first super-pixel;

sending the first weighted semantic feature data to an input layer of a dilational convolutional neural network; and determining, from an output layer of the dilational convolutional neural network, a binary classification of a first pixel of the first plurality of contiguous pixels indicating that the first pixel corresponds to the common object.

4. A method of image segmentation, comprising:

receiving first image data i and second image data j;

determining first semantic feature data for the first image data i;

determining second semantic feature data for the second image data j;

determining filtered semantic feature data corresponding to the first semantic feature data by filtering the first semantic feature data and the second semantic feature data in a semantic feature space, wherein the filtered semantic feature data represents a semantic similarity between a first portion of the first image data i and other portions of the first image data i and between the first portion of the first image data i and portions of the second image data j, wherein the filtered semantic feature data is determined by computing $\Sigma_j \Sigma_t k(\overline{F}(i, s), \overline{F}(j, t))\overline{F}(j, t)$ with a filter kernel k, where $\overline{F}(i, s)$ represents the first semantic feature data for a first super-pixel s in the first image data i, and where $\overline{F}(j, t)$ represents the second semantic feature data for a second super-pixel t in second image data j;

determining that a first pixel corresponding to the filtered semantic feature data corresponds to a first class of object, wherein the first class of object is represented in the first image data i and the second image data j; and generating a first segmentation mask of the first image data i, wherein the first pixel is labeled as foreground image data in the first segmentation mask.

5. The method of claim 4, further comprising:

determining the first super-pixel s of the first image data i, wherein the first super-pixel s comprises a first number of contiguous pixels grouped based at least in part on a similarity among the first number of contiguous pixels, wherein the first semantic feature data for the first image data i comprises a first vector representation of a first pixel of the first number of contiguous pixels and a second vector representation of a second pixel of the first number of contiguous pixels.

6. The method of claim 5, further comprising:

determining, for the first super-pixel s, that a magnitude of the first vector representation represents a maximum magnitude among magnitudes of vector representations associated with the first number of contiguous pixels; and selecting the first vector representation as the first semantic feature data representing the first super-pixel s.

7. The method of claim 4, further comprising:

determining the first semantic feature data for a first super-pixels of the first image data i, the first super-pixels comprising a first group of contiguous pixels;

determining the filtered semantic feature data for the first super-pixel s; and assigning the filtered semantic feature data to a first pixel of the first group of contiguous pixels.

8. The method of claim 7, further comprising:

sending the filtered semantic feature data of the first pixel to a 1×1 convolutional neural network (CNN); and generating, by the 1×1 CNN, an n-dimensional vector representation of the filtered semantic feature data of the first pixel, where n corresponds to a number of neurons in an input layer of a downstream dilational CNN.

9. The method of claim 4, further comprising:

sending the filtered semantic feature data to a dilational CNN; and determining, by the dilational CNN, a classification for a first pixel of the first image data i, wherein the classification indicates that the first pixel represents some portion of a first object of the first class of object.

10. The method of claim 4, further comprising:

sending the first image data i to a CNN trained to classify one or more objects;

determining, from a hidden layer of the CNN, the first semantic feature data for the first image data i;

sending the second image data j to the CNN; and determining from the hidden layer of the CNN, the second semantic feature data for the second image data j.

11. The method of claim 4, further comprising:

determining an identification of the first class of object;

storing the identification of the first class as a first label in association with the first segmentation mask as first training data; and training a convolutional neural network to classify objects of the first class based at least in part on the first training data.

12. A system comprising:

at least one processor; and a non-transitory computer-readable memory storing instructions that, when executed by the at least one processor, are effective to program the processor to perform a method comprising:

receiving first image data i and second image data j;

determining first semantic feature data for the first image data i;

determining second semantic feature data for the second image data j;

determining filtered semantic feature data corresponding to the first semantic feature data by filtering the first semantic feature data and the second semantic feature data in a semantic feature space, wherein the filtered semantic feature data represents a semantic similarity between a first portion of the first image data i and other portions of the first image data i and between the first portion of the first image data i and portions of the second image data j, wherein the filtered semantic feature data is determined by computing $\Sigma_j \Sigma_t k(\overline{F}(i, s), \overline{F}(j, t))\overline{F}(j, t)$ with a filter kernel k, where $\overline{F}(i, s)$ represents the first semantic feature data for a first super-pixel s in the first image data i, and where $\overline{F}(j, t)$ represents the second semantic feature data for a second super-pixel t in second image data j;

determining that a first pixel corresponding to the filtered semantic feature data corresponds to a first class of object, wherein the first class of object is represented in the first image data i and the second image data j;

generating a first segmentation mask of the first image data i, wherein the first pixel is labeled as foreground image data in the first segmentation mask; and storing the first segmentation mask in the non-transitory computer-readable memory.

13. The system of claim 12, the non-transitory computer-readable memory storing further instructions that, when executed by the at least one processor, are further effective to program the at least one processor to perform the method further comprising:

determining the first super-pixels of the first image data i, wherein the first super-pixel s comprises a first number of contiguous pixels grouped based at least in part on a similarity among the first number of contiguous pixels, wherein the first semantic feature data for the first image data i comprises a first vector representation of a first pixel of the first number of contiguous pixels and a second vector representation of a second pixel of the first number of contiguous pixels.

14. The system of claim 13, the non-transitory computer-readable memory storing further instructions that, when executed by the at least one processor, are further effective to program the at least one processor to perform the method further comprising:

determining, for the first super-pixel s, that a magnitude of the first vector representation represents a maximum magnitude among magnitudes of vector representations associated with the first number of contiguous pixels; and selecting the first vector representation as the first semantic feature data representing the first super-pixel s.

15. The system of claim 12, the non-transitory computer-readable memory storing further instructions that, when executed by the at least one processor, are further effective to program the at least one processor to perform the method further comprising:

determining the first semantic feature data for the first super-pixel s of the first image data i, the first super-pixel s comprising a first group of contiguous pixels;

determining the filtered semantic feature data for the first super-pixel s; and assigning the filtered semantic feature data to a first pixel of the first group of contiguous pixels.

16. The system of claim 15, the non-transitory computer-readable memory storing further instructions that, when executed by the at least one processor, are further effective to program the at least one processor to perform the method further comprising:

sending the filtered semantic feature data of the first pixel to a 1×1 convolutional neural network (CNN); and generating, by the 1×1 CNN, an n-dimensional vector representation of the filtered semantic feature data of the first pixel, where n corresponds to a number of neurons in an input layer of a downstream dilational CNN.

17. The system of claim 12, the non-transitory computer-readable memory storing further instructions that, when executed by the at least one processor, are further effective to program the at least one processor to perform the method further comprising:

sending the filtered semantic feature data to a dilational CNN; and determining, by the dilational CNN, a classification for a first pixel of the first image data i, wherein the classification indicates that the first pixel represents some portion of a first object of the first class of object.

18. The system of claim 12, the non-transitory computer-readable memory storing further instructions that, when executed by the at least one processor, are further effective to program the at least one processor to perform the method further comprising:

sending the first image data i to a CNN trained to classify one or more objects;

determining, from a hidden layer of the CNN, the first semantic feature data for the first image data i;

sending the second image data j to the CNN; and determining from the hidden layer of the CNN, the second semantic feature data for the second image data j.

* * * * *